United States Patent

Maines et al.

[15] 3,660,756
[45] May 2, 1972

[54] FREQUENCY SENSITIVE DETECTING AND MEASURING CIRCUITS BASED ON THE ACOUSTIC ELECTRIC EFFECT

[72] Inventors: James Dennis Maines; Edward George Sydney Paige, both of Malvern, England

[73] Assignee: National Research Development Corporation, London, England

[22] Filed: May 7, 1969

[21] Appl. No.: 822,682

[30] Foreign Application Priority Data

May 10, 1968 Great Britain ................... 22,263/68

[52] U.S. Cl. .................................. 324/80, 329/117
[51] Int. Cl. ........................................... G01r 23/00
[58] Field of Search ............. 329/111, 117, 119, 198; 331/158; 332/26; 324/80

[56] References Cited

UNITED STATES PATENTS

| | | | |
|---|---|---|---|
| 1,941,581 | 1/1934 | Runge | 324/80 X |
| 2,154,127 | 4/1939 | Hollmann | 324/80 X |
| 2,539,204 | 1/1951 | Rambo | 331/158 X |
| 2,594,091 | 4/1952 | Summerhayes | 331/158 X |
| 2,724,089 | 11/1955 | Ruston | 329/117 X |
| 2,849,607 | 8/1958 | Leister | 329/117 |
| 2,769,091 | 10/1956 | Hansel | 324/77 E X |
| 3,325,748 | 6/1967 | Crabbe | 331/107 A |
| 3,314,022 | 4/1967 | Meitzler | 331/107 A |

OTHER PUBLICATIONS

Yasukawa; Jour. Applied Physics, July 1966, pp. 3301–3303.
White et al.; Physical Review; 16 Sept. 1966; pp. 628–630.

*Primary Examiner*—Alfred E. Smith
*Attorney*—Cushman, Darby & Cushman

[57] ABSTRACT

A detector consists of an acousto-electric oscillator biased above cut-off for spontaneous acousto-electric oscillations and stimulates into acousto-electric oscillations by the a.c. signal to be detected. Alternatively the power supply to an acousto-electric oscillator may be pulsed, in which case the time delay between the beginning of the pulse and the build-up of significant acousto-electric current will depend upon the applied voltage, provided that the applied voltage is in the region of cut-off for spontaneous acousto-electric oscillations.

4 Claims, 9 Drawing Figures

FREQUENCY SENSITIVE DETECTING AND MEASURING CIRCUITS BASED ON THE ACOUSTIC ELECTRIC EFFECT

The present invention relates to applications of acousto-electric oscillators.

Acousto-electric oscillators using thin platelets of certain semiconductor materials such as cadmium sulphide and zinc oxide are described in our co-pending U.S. Pat. application No. 747,777 filed July 18, 1968, now abandoned.

Although crystal controlled oscillators are well-known using quartz resonators, it is difficult to make a stable high frequency oscillator having a narrow line width. This is because the higher harmonics of a quartz oscillator suffer line broadening, making it essential to operate on the fundamental frequency of the quartz. For a fundamental frequency of $10^8$ cycles per second a slice of quartz 10 microns thick has to be accurately prepared. This is difficult; and for substantially higher fundamental frequencies the preparation of thinner slices of the required tolerance is beyond present techniques.

Furthermore it is only possible to change the output frequency of quartz controlled oscillators using sophisticated and expensive circuitry. While the frequency of LC oscillators is more easily changed, the lack of a narrow line width in this type of oscillator is a disadvantage for many applications.

However, it is possible to provide a solid state oscillator which covers a substantial frequency range and has a narrow line width together with the facility of rapidly changing the frequency of oscillation. Such a change may be continuous and periodic in time, when it is described as frequency modulation, or in discrete steps in time, when it is known as frequency switching; alternatively it may simply be used in order to tune the oscillator to a given frequency.

Such a solid state oscillator may include: a body of semiconductor material in which the interaction between free carriers and lattice waves is sufficiently strong to give an increase in amplitude of the lattice waves; means for applying a voltage gradient across the body sufficiently high for the maintenance of excited lattice waves; and means for varying the applied voltage gradient whereby the frequency of the excited lattice waves is varied.

The increase in amplitude of the lattice waves may be due to round trip amplification. The semiconductor material may be a piezoelectric material or, if not, the effect may rely on the electrostatic or deformation potential properties of the material. The body may have plane parallel opposite surfaces.

When a sufficiently high voltage is applied to a platelet of a piezoelectric semiconductor material such as cadmium sulphide, oscillations occur in the current at frequencies ranging from a few million cycles per second into the gigacycle per second range, dependent upon the material and its conductivity. This property may be used in an electrical oscillator. The phenomenon is related to mechanisms which produce a build-up of lattice waves in the platelet. These lattice waves may of course be used directly, for example, by bonding a low loss acoustic material to the oscillator and extracting a fraction of the acoustic power.

In other semiconductor materials oscillations may occur in the presence of an applied voltage by virtue of the deformation potential or electrostrictive effect.

Piezoelectric semiconductors have the property of being ultrasonic amplifiers in the presence of an electric current; in other words, if an electric current is passed through a body of a piezoelectric semiconductor material having plane parallel sides transverse to the direction of current flow then ultrasonic waves transmitted within the material are amplified in the direction of the current (i.e. in the direction of the electron flow). Ultrasonic waves being propagated in the opposite direction are attenuated. In the present device there is no acoustic input; the oscillation builds up from the thermally excited lattice vibrations. These lattice vibrations are amplified as they flow in the direction of the electric current, and (since the body has plane parallel sides) reflected back. On the return journey the waves are attenuated, but are once more reflected and amplified. If there is round trip gain then the oscillations build up in intensity provided that the oscillations are of such a wavelength in the body that it is an integral number of half wavelengths in thickness. Thus many modes of oscillation are possible, based on different integral numbers of half wavelengths; the platelet forms an acoustic cavity with internal gain. Alternatively the feedback leading to build-up of acoustic waves may be produced electrically through the spatially uniform, oscillating electric field which accompanies any current oscillation.

In practice, with continuous (rather than pulsed) electrical excitement one particular mode and its harmonics buildup; very high order harmonics of the fundamental (such as the 200th) are usable, and with the internal gain mentioned above provides a high frequency, narrow line width source.

The oscillations appear both as a modulation of the current through the body and as an ultrasonic wave generated in the body. This phenomenon is to be distinguished from other instabilities observed in piezoelectric semiconductors which are due to high field domains or non-uniform resistivities and usually occur at frequencies of a few million cycles per second or below. The oscillations of the device described will occur in cases where there is round trip amplification of lattice waves.

A simple piezoelectric solid state oscillator may comprise a body of piezoelectric semiconductor material connected across a voltage source. For example the piezoelectric semiconductor material may be cadmium sulphide. In this instance the voltage is applied to the body by indium bonds on the two opposite plane parallel surfaces of the body. The indium bonds are good conductors and the leads from the voltage source are in good electrical contact with them.

Typical dimensions would be as follows. Thickness of the body about 200 microns. Resistivity of the order of $10^4$ ohm-centimeters. Applied voltage, about 60 volts. This would give stable oscillations in the region of $10^8$ cycles per second at room temperature.

The observations can be made using either a pulsed voltage or continuous voltage but using a pulsed voltage many modes of the platelet, from fundamental up to about the 200th harmonic may be observed while with a continuous voltage only a few modes are observed. This latter method gives a much stronger oscillation. It is possible to use this method of oscillation for several devices. It is possible to select a particular mode by external tuning, for example by a resonant electrical circuit. Selective acoustic reflection, for example by an acoustic cavity bonded on the body, may also be used to select modes.

A frequency modulated solid state oscillator may comprise a source of alternating voltage connected across the voltage source of the basic oscillator via a capacitor. The effect of the alternating voltage is to modulate the velocity of sound in the material of which the body is made. Since the body essentially forms an acoustic cavity supporting a well defined wavelength the change in the velocity of sound produces a change in frequency of oscillation. Thus the circuit will generate a frequency modulated carrier: the modulation frequency is that of the source of alternating voltage and the carrier frequency is that frequency generated by the circuit in the absence of any modulation frequency. In other words the carrier frequency may be in the HF, VHF or UHF and microwave wavebands.

A frequency modulated radio transmitter for use in the same wavebands (which find extensive use for radio communications for entertainment, radio telephone and other uses) may comprise a dipole aerial connected across the body of the frequency modulated oscillator and frequency modulated waves can then be transmitted by the transmitter. Naturally the circuit would be improved by a power amplifier stage before the aerial but for short transmission distances this circuit may be adequate.

A frequency modulated electro-acoustic transducer differs from the radio transmitter previously discussed only in that the acoustic output of the oscillator is used instead of the electric output. Electrically the circuit is the same as for the radio transmitter, but one of the plane parallel sides of the body is bonded to an acoustic medium by an acoustic bond. By this means the acoustic oscillations in the body are launched into the medium.

The oscillation frequency of the oscillators described is dependent on the resistivity of the material since the velocity of sound varies as the resistivity is varied. The narrow line width enables small frequency changes to be measured. Thus small changes in light intensity can be measured if the body is a photoconducting semiconductor (for example, semi-insulating cadmium sulphide), both directly (by the frequency modulated oscillator)and remotely (by the transmitter circuits) by accurate measurement of frequency shifts.

Similarly the oscillation frequency is dependent on temperature, on magnetic field and on strain in the material and in this way the circuits described may be used as thermometers, magnetic flux meters or strain gauges. The strain gauge possibility leads to the further possibility of a transmitting gramophone pickup or a transmitting microphone.

A switched frequency solid state oscillator may comprise a body of semiconductor material connected to a source of several discrete voltages via a means of electing any one of the discrete voltages. By this means very rapid switching between the frequencies corresponding to the discrete voltages is possible. The switching may be performed mechanically or electronically. This arrangement offers the possibility of a time sharing system using several channels operating at different frequencies and switching between them.

It is an object of the invention to use these oscillators as detectors either of electromagnetic or acoustic energy.

According to the present invention there is provided an acousto-electric oscillator, means for applying a direct voltage $V_{app}$ to the acousto-electric oscillator such that $V_{app}$ is above the cut-off voltage $V_{co}$ for spontaneous acousto-electric oscillation and means for applying an alternating current signal to be detected to the acousto-electric oscillator.

According to the invention in another aspect there is provided an acousto-electric oscillator, means for applying a pulsed direct voltage of amplitude $V_{app}$ to the acousto-electric oscillator such that $V_{app}$ is near but below the cut-off voltage $V_{co}$ for spontaneous acousto-electric oscillation and means for measuring the time interval between the leading edge of the direct voltage pulse and the build-up of significant acousto-electric current.

It is possible to use the properties of the acousto-electric oscillator to make a simple receiver (either of electromagnetic or ultrasonic waves). This application utilizes the properties of an oscillator biased just above cut-off and is described below.

For an oscillator platelet of a given resistivity and size there is a well defined voltage range which allows oscillation. When the platelet is driven from a constant voltage source, the applied voltage $V_{app}$ must lie in the range $V_{th} < V_{app} < V_{co}$, where $V_{th}$ is a threshold voltage and $V_{co}$ is a cut-off voltage. Below the threshold voltage $V_{th}$ there is no spontaneous build-up of acoustic flux. In the vicinity of the cut-off voltage $V_{co}$ the round trip gain decreases with increasing applied voltage $V_{app}$ and again there is no spontaneous acoustic flux build-up above the cut-off voltage $V_{co}$.

On the other hand, when the platelet is driven from a source which has a finite impedance so that the current-voltage characteristic exhibits a negative slope, the cut-off voltage $V_{co}$ is defined in terms of electron velocity. There is a finite range of electron velocities $v_{th} < v < v_{co}$ for which round-trip gain can occur, where $v$ is the mean electron drift velocity, $v_{th}$ a threshold velocity and $v_{co}$ a cut-off velocity. $V_{co}$ is now defined as the applied voltage for which the electron velocity is $v_{co}$ and $V_{th}$ is the applied voltage for which the electron velocity is $v_{th}$.

If a crystal is biased close to but above cut-off so that there is no spontaneous oscillation growth, a build-up of acoustic flux can be stimulated by an externally applied voltage at a frequency which corresponds to a mode of the platelet. The build-up of acoustic flux in the cavity causes the impedance of the platelet to increase significantly; this is a consequence of the acousto-electric effect. A significant increase in impedance occurs when the specimen exhibits a negative resistance (a negative slope of the current/voltage characteristic) in the vicinity of the cut-off voltage. This may be the case for a range of resistivities — for example, in cadmium sulphide, $10^4$ ohm-centimeters is within the range.

The presence of a radio frequency signal can then be detected by observing the result of this change in impedance.

Embodiments of the invention will be described by way of example with reference to the accompanying drawings, in which:

FIG. 6 is a circuit diagram of and

Figure 1:
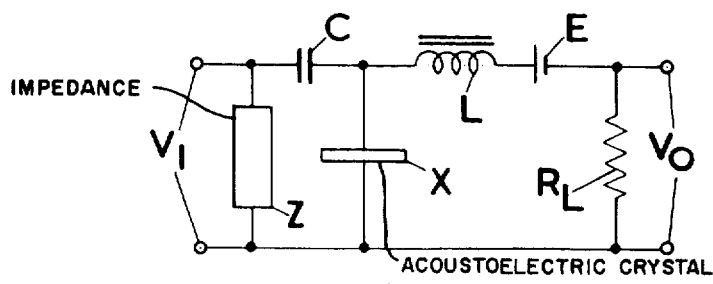
FIG. 1 is a circuit diagram of a detector which gives a direct current output corresponding to a radio frequency input.

FIG. 1 is a circuit diagram of a detector which gives a direct current output corresponding to a radio frequency alternating current input. A body X of piezoelectric material is connected in series with a choke L, a direct voltage source E and a load resistor $R_L$. A source of radio frequency voltage $V_I$ is connected across an impedance Z and injected into the above described circuit via a capacitor C connected between one terminal of the impedance Z and the junction between the body X and the choke L. The terminal of the radio frequency source $V_I$ connected to the other terminal of the impedance Z is connected to the other side of the body X. An output voltage $V_o$ is taken from the terminals of the load resistor $R_L$.

The action of the circuit is as follows. The voltage of the source E is arranged to be sufficiently high for the voltage $V_{app}$ applied to the body X to be just above the cut-off voltage $V_{co}$ for acousto-electric oscillation.

However, on the application of a radio frequency alternating voltage $V_I$ to the input of the circuit a build-up of acoustic flux can be stimulated, provided that the frequency of the r.f. voltage corresponds to a mode of the platelet. The particular mode may be selected by external electrical tuning, for example by adjusting the value of the impedance Z, or by selective acoustic reflection, for example an acoustic cavity bonded on the body X. The value of the resistor $R_L$ will be chosen to give optimum performance of the circuit as a detector, i.e. optimum change in d.c. current through $R_L$ when $V_I$ is applied.

Figure 2:
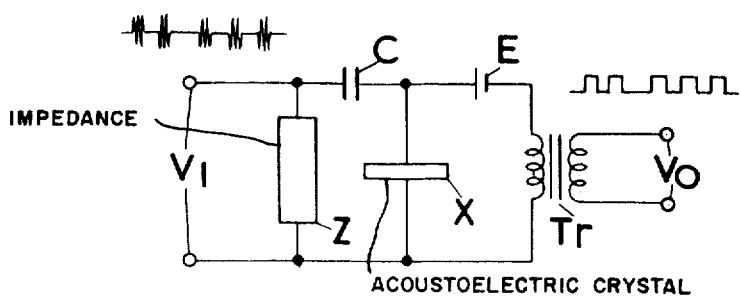
FIG. 2 is a circuit diagram of a detector for the detection of pulsed radio frequency alternating voltage signals.

FIG. 2 is a circuit diagram of a detector for the detection of pulsed radio frequency alternating voltage signals. A body X of piezoelectric material is connected in series with a direct voltage source E and the primary winding of an output transformer Tr. A source of radio frequency voltage $V_I$ is connected across an impedance Z and injected into the above described circuit via a capacitor C connected between one terminal of the impedance Z and the junction between the body X and the source E. The terminal of the radio frequency source $V_I$ connected to the other terminal of the impedance Z is connected to the other side of the body X. An output voltage $V_o$ is taken from the secondary winding of the output transformer Tr.

The action of the circuit is very nearly the same as that of the circuit described above with reference to FIG. 1. Pulses of radio frequency voltage are detected and appear at the output as unidirectional voltage pulses.

Significant power gain may be achieved in the circuit which may therefore be particularly useful when the radio frequency signal is the signal received by an aerial.

The input and output circuits are shown electrically separated but this need not be the case.

Figure 2A:
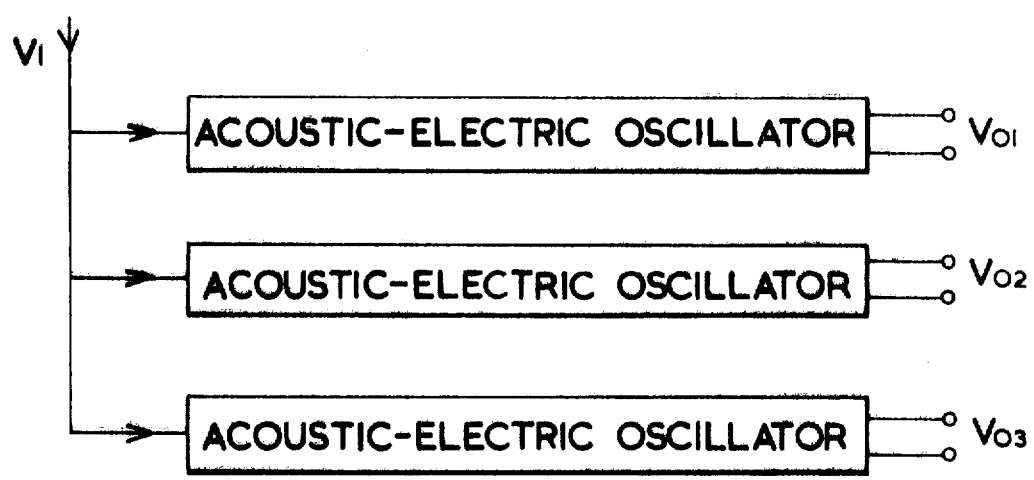
FIG. 2a is a circuit diagram of an arrangement for feeding signals to a plurality of oscillators tuned to different frequencies.

The radio frequency may be fed simultaneously to several such detecting systems with each oscillator sensitive to a different frequency whereby signals having different frequencies may be separated into different respective channels. This is illustrated in FIG. 2a and may have applications in the reception of pulse signals transmitted by frequency shift keying.

The oscillator frequency may be tuned by adjusting certain parameters, for example applied voltage, mechanical strain, level of illumination or magnetic field. It is therefore possible to detect a frequency switched multichannel radio frequency signal in a single oscillator by changing one of the above parameters in synchronism with the changes in frequency of the incoming signal. This could be done in a prearranged sequence.

Figure 3:
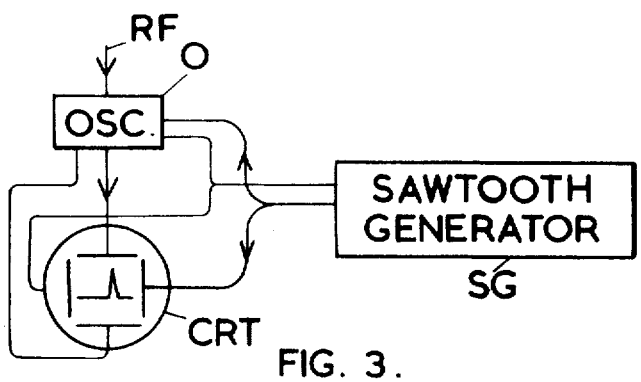
FIG. 3 is a block diagram of a frequency shift detector.
Figure 4:
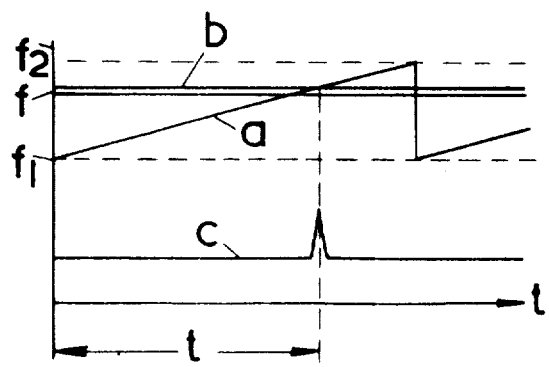
FIG. 4 is a series of waveforms, plotted against time, used for explaining the working of FIG. 3.

FIG. 3 is a block diagram of a frequency shift detector and FIG. 4 is a series of waveforms, plotted against time, used for explaining the working of FIG. 3. A source RF of radio frequency energy is applied to an acousto-electric oscillator O whose frequency is modulated in a sawtooth manner under the control of a sawtooth generator SG. The detected output of the oscillator is applied to the Y shift plates of a cathode ray tube CRT. The output of the sawtooth generator SG is applied to the X shift plates of the cathode ray tube CRT.

The action of the circuit will be explained with reference to FIG. 4, in which a waveform $a$ represents the frequencies to which the oscillator O is sensitive. The frequencies are swept in a saw-tooth fashion. If the radio frequency $f$ (denoted by a waveform $b$) lies between the limits $f_1$ and $f_2$ of the frequency sawtooth $a$ then at the instant when the waveforms $a$ and $b$ cross a signal will be generated in the detected output of the oscillator O. The output of the oscillator O is represented by a waveform $c$, and the waveform $c$ has pulses of energy delayed from the leading edges of the sawtooth waveform by a time $t$. If the sawtooth waveform is linear then $t$ is proportional to the difference $f-f_1$ in frequency between the radio frequency $f$ and the frequency $f_1$ at the beginning of each sawtooth.

The detected output of the oscillator O being applied to the Y plates of the cathode ray tube CRT, a pip is produced at the instant when the frequency to which the oscillator O is sensitive is the same as the radio frequency $f$. Because of the drive applied to the X plates of the cathode ray tube CRT, which is the same as the waveform controlling the frequency of the oscillator O, the shift of the pip along the X axis of the cathode ray tube CRT will be proportional to the frequency difference $f-f_1$. In other words the distance along the X axis can be made to give frequency shifts directly. This may be particularly useful for small frequency shifts such as may be obtained in a doppler shifted radar return signal.

If the radio frequency applied to the oscillator O has a complex line spectrum then the cathode ray tube CRT will give returns for all values $f$ of incident radio frequency between $f_1$ and $f_2$. The arrangement can therefore be used for detailed spectral analysis, band-by-band.

The discussion so far has been concerned with exciting the oscillator using an alternating electric field at a frequency corresponding to a mode of the platelet. The excitation could equally well be acoustic and what has been said previously is valid as a detector of acoustic signals also.

The oscillator has been described using a battery E as the direct voltage source. This can of course be driven from other sources including a pulsed voltage source which may be necessary for applications in which the oscillator does not switch off spontaneously when the radio frequency signal is removed.

Figure 5:
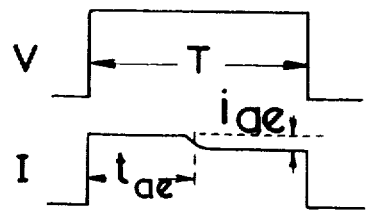
FIG. 5 is a graph consisting of two waveforms, plotted against time, illustrating a further embodiment of the invention.

FIG. 5 is a graph consisting of two waveforms, plotted against time, illustrating a further embodiment of the invention. The resistivity of the platelet in an oscillator can be chosen such that the application of a voltage pulse of the form V of magnitude $V_{app}$ such that $V_{th} < V_{app} < V_{co}$ and of duration T gives operation just below cut-off and produces a current through the platelet of the form I. This current starts by being a constant current but at a time $t_{ae}$ falls to a new constant value which is less than its previous value by the acousto-electric current $i_{ae}$. The time $t_{ae}$ is determined by the time taken for the acoustic flux to reach a sufficient level to produce the acousto-electric current $i_{ae}$. For increasing applied voltage $V_{app}$, as $V_{app}$ approaches $V_{co}$, the time $t_{ae}$ increases.

Figure 6:
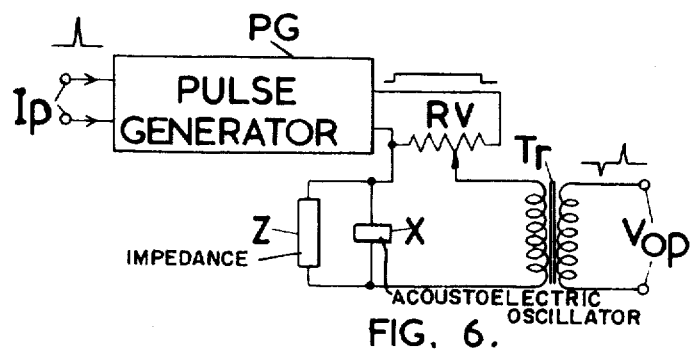

The above effect may form the basis of a voltage-controlled time delay system. FIG. 6 is a circuit diagram of such a system and FIG. 7 is a series of waveforms, plotted against time, used for explaining its working.

In FIG. 6 a conventional pulse generator PG has an input IP and produces an output consisting of a square pulse beginning at the instant it receives a pulse from the input IP and having a predetermined fixed duration. Its output is applied to the ends of a potentiometer $R_V$. The voltage between one end of the potentiometer $R_V$ and its slider is used as the voltage source in an acousto-electric oscillator, being connected in series with a body X of piezoelectric material and the primary winding of a transformer Tr; a complex impedance Z is connected across the body X. The output of the circuit is taken from the secondary winding of the transformer Tr.

Figure 7:
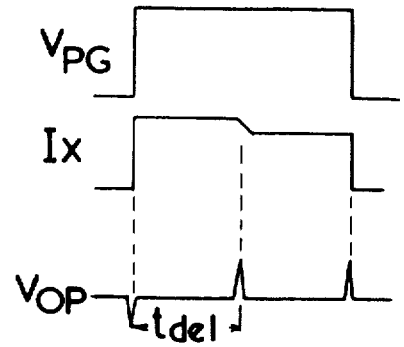
FIG. 7 is a series of waveforms appearing in a voltage-controlled time delay system.

In FIG. 7 the voltage output $V_{PG}$ of the pulse generator PG is shown. The resultant current $I_x$ through the body X will be as described above with reference to FIG. 5. A differentiated version of this will constitute the output voltage $V_{op}$; this will have a negative spike at the beginning of each $V_{PG}$ waveform, a positive spike at the instant when the current falls (this instant following the beginning of the $V_{PG}$ waveform by a period $t_{del}$) and a second positive spike at the end of the $V_{PG}$ waveform.

The delay $t_{del}$ is, as explained above, dependent on the voltage applied to the oscillator, which is dependent on the setting of the potentiometer $R_V$. The delay $t_{del}$ is presented at the output by pulses of opposite polarity; the second positive pulse contemporaneous with the end of the $V_{PG}$ waveform is not used.

Figure 8:
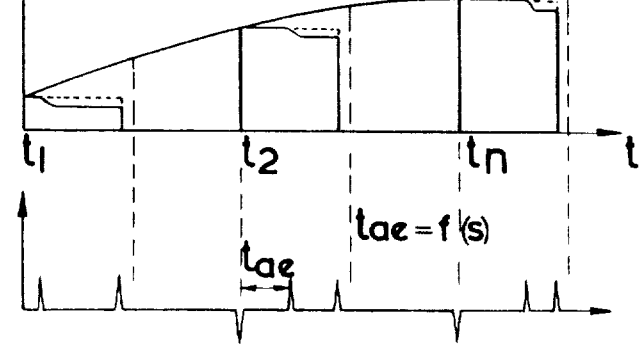
FIG. 8 is a series of waveforms occurring in an amplitude to pulse position modulation sampling converter.

The invention can also be used in an amplitude to pulse position modulation sampling converter and FIG. 8 is a series of waveforms illustrating this. In an amplitude to pulse position modulation sampling converter a waveform is sampled periodically in amplitude and at the time of each sampling two pulses are generated. The first pulse is contemporaneous with the sampling and the second pulse varies in position according to the amplitude of the original waveform.

In the present application the waveform WF is sampled at instants $t_1, t_2, \ldots, t_n$. The voltage of the waveform is applied to an oscillator as described above with reference to FIG. 6 and two pulses are produced; the delay $t_{del}$ between them is proportional to the magnitude of the waveform WF at the time of sampling. The second positive pulse (referred to above) which is contemporaneous with the end of the $V_{PG}$ waveform may be gated out. The resulting waveform is the required pulse position modulation waveform.

I claim:

1. An acoustic-electric oscillator circuit for detecting alternating signals, said circuit comprising:
   an acoustic-electric oscillator,
   bias means connected to said oscillator for biasing said acoustic-electric oscillator at a direct voltage $V_{app}$ above the cut-off voltage $V_{co}$ for spontaneous acoustic-electric oscillation,
   input means for applying said alternating signal to said acoustic-electric oscillator thereby causing a build-up of acoustic-electric oscillations in spite of the applied bias voltage $V_{app}$ provided that the frequency of said alternating signals corresponds to one of the operating modes of said oscillator, and
   output means for providing an output signal representing the resulting change in the impedance of said acoustic-electric oscillator caused by said build-up of acoustic-electric oscillations thereby providing an indication of said alternating signals.

2. An acoustic-electric oscillator circuit as in claim 1 further comprising:
tuning means for changing the frequency of the operating modes of said oscillator, and
display means connected to said tuning means and to said output means for indicating the frequency of said alternating signals by correlating the instantaneous frequency of at least one operating mode of said oscillator with said output signal indicating a detected alternating signal.

3. A plurality of acoustic-electric oscillator circuits as in claim 1 with each such circuit tuned to a different frequency and connected to a common source of said alternating signals and further comprising means for determining which of said oscillator circuits is in oscillation.

4. An acoustic-electric oscillator circuit as in claim 1 wherein said input means comprises electrical means for inputting an electrical alternating signal to said acoustic-electric oscillator.

* * * * *